(12) United States Patent
Kim et al.

(10) Patent No.: US 7,862,919 B2
(45) Date of Patent: Jan. 4, 2011

(54) BATTERY PACK AND ELECTRONIC DEVICE USING THE SAME

(75) Inventors: Heong-Sin Kim, Suwon-si (KR);
Jong-Hwa Hur, Suwon-si (KR);
Kyung-Won Seo, Suwon-si (KR)

(73) Assignee: Samsung SDI Co., Ltd., Suwon-Si, Gyoenggi-do (KR)

( * ) Notice: Subject to any disclaimer, the term of this patent is extended or adjusted under 35 U.S.C. 154(b) by 0 days.

(21) Appl. No.: 12/239,039

(22) Filed: Sep. 26, 2008

(65) Prior Publication Data
US 2009/0123829 A1    May 14, 2009

(30) Foreign Application Priority Data
Nov. 8, 2007    (KR) .................. 10-2007-113804

(51) Int. Cl.
*H01M 2/10*    (2006.01)
*H01M 16/00*    (2006.01)
(52) U.S. Cl. ............................. 429/9; 429/99; 429/162
(58) Field of Classification Search ............... 429/9, 429/99, 162
See application file for complete search history.

(56) References Cited

U.S. PATENT DOCUMENTS

| | | | | |
|---|---|---|---|---|
| 3,992,225 | A | * | 11/1976 | Sykes ....................... 429/9 X |
| 5,162,164 | A | * | 11/1992 | Dougherty et al. ............. 429/9 |
| 5,614,331 | A | * | 3/1997 | Takeuchi et al. ............... 429/9 |
| 5,811,204 | A | * | 9/1998 | Nitzan .................... 429/162 X |
| 7,714,542 | B2 | | 5/2010 | Lee et al. |
| 2001/0052758 | A1 | * | 12/2001 | Odaohhara ................ 429/9 X |
| 2003/0215702 | A1 | * | 11/2003 | Tanjou et al. ............... 429/127 |
| 2004/0119442 | A1 | | 6/2004 | Lee et al. |
| 2005/0077878 | A1 | | 4/2005 | Carrier et al. |
| 2006/0043925 | A1 | | 3/2006 | Tuin |
| 2006/0194101 | A1 | | 8/2006 | Ha et al. |

FOREIGN PATENT DOCUMENTS

| | | |
|---|---|---|
| EP | 1 519 428 A2 | 3/2005 |
| EP | 1 760 803 A1 | 3/2007 |
| JP | 2004-111098 | 4/2004 |
| JP | 2004-179053 | 6/2004 |
| JP | 2004-273221 | 9/2004 |

(Continued)

OTHER PUBLICATIONS

European Search Report issued in European Patent Application No. 08168379.9 on Mar. 25, 2009.

(Continued)

*Primary Examiner*—Stephen J. Kalafut
(74) *Attorney, Agent, or Firm*—Knobbe Martens Olson & Bear LLP

(57) ABSTRACT

A high-capacity battery pack attachable to a small-sized electronic device in which a lithium-polymer cell and a lithium-ion cell are physically coupled and to be electrically connected in parallel, and an electronic device using the battery pack maximize a battery mounting space while providing a high-capacity battery pack useful for the small-sized electronic device. The battery pack is arranged such that the lithium-polymer cell having a thin thickness in a large cross-sectional area and a lithium-ion cell having a thick thickness in a small cross-sectional area are appropriately arranged to maximize the space of the battery accommodating portion.

28 Claims, 6 Drawing Sheets

FOREIGN PATENT DOCUMENTS

| | | |
|---|---|---|
| JP | 2004-311402 | 11/2004 |
| JP | 2006-164579 | 6/2006 |
| KR | 2004-37547 | 5/2004 |
| KR | 10-2004-0054233 A | 6/2004 |
| KR | 2006-22972 | 3/2006 |
| KR | 10-570726 | 4/2006 |
| KR | 2006-49784 | 5/2006 |
| KR | 2006-73432 | 6/2006 |
| KR | 10-2008-0011833 A | 2/2008 |
| KR | 10-2008-0034409 A | 4/2008 |
| WO | WO 2008/048028 A1 | 4/2008 |

OTHER PUBLICATIONS

Korean Office Action issued Oct. 29, 2009 in the corresponding Korean Patent Application No. 10-2007-0113804.

Korean Notice of Allowance dated Sep. 6, 2010 in Korean Patent Application No. KR 10-2007-0113804 corresponding to subject U.S. Appl. No. 12/239,039.

* cited by examiner

BATTERY PACK AND ELECTRONIC DEVICE USING THE SAME

CROSS-REFERENCE TO RELATED APPLICATIONS

This application claims the benefit of Korean Patent Application No. 2007-113804, filed Nov. 8, 2007, the disclosure of which is incorporated herein by reference.

BACKGROUND OF THE INVENTION

1. Field of the Invention

Aspects of the present invention relate to a battery pack and an electronic device using the same, and more particularly, to a high-capacity battery pack, which can be joined to a small-sized set for use by allowing a lithium-polymer cell and a lithium-ion cell to be physically coupled and to be electrically connected in parallel, and an electronic device using the battery pack.

2. Description of the Related Art

As camcorders, mobile phones, notebook computers, and the like are widely used together with the rapid development of electronic, communication, and computer industries, it has been recently necessary to develop high-capacity secondary batteries which are light and have a long lifetime and provide high performance.

As a possible solution to environmental and energy problems, large-sized secondary batteries for electric vehicles and effective use of power at night are being developed. Thus, lithium secondary batteries have come into the spotlight, and their application range has been widely extended.

A lithium secondary battery may be mounted onto an electronic device and may be a battery pack in which a protective circuit board connects to at least one bare cell. The bare cell is formed by accommodating an electrode assembly including a positive electrode plate, a negative electrode plate, and a separator disposed therebetween together with an electrolyte in a can and then sealing an opening of the can with a cap assembly. The protective circuit board is provided with safety devices such as a positive temperature coefficient (PTC) thermistor, a thermal fuse, and a protective circuit module.

A battery pack may be a hard pack which is received in an outer case for at least one bare cell, a safety device, and the like, or an inner pack in which a gap between the bare cell and the protective circuit board is filled with hot-melt resin and which is tubed and labeled with a thin casing.

Depending on the types of electrolyte, lithium secondary batteries may be classified into lithium-metal batteries and lithium-ion batteries in which an organic solvent electrolyte is used and lithium-polymer batteries in which a solid polymer electrolyte is used.

The lithium secondary batteries may be further classified into cylinder-type batteries, prismatic-type batteries, and pouch-type batteries according to the shape of the can.

When the lithium secondary battery is a lithium-polymer battery in which a solid polymer electrolyte is used, the external shape is generally formed in a pouch shape. When the lithium secondary battery is a lithium-ion battery in which an organic solvent electrolyte is used, the external shape is generally formed in a cylindrical shape or a prismatic shape.

The conventional lithium-polymer cell that is formed in a pouch shape having a thickness that is relatively thin in a relatively large cross-sectional area compared to a conventional lithium-ion cell that is formed in a cylindrical or prismatic shape has a thickness that is relatively thick in a relatively small cross-sectional area.

Lithium-polymer cells have been used for small-sized devices, such as mobile phones or MP3 players, rather than high-capacity devices, and cylinder-type lithium-ion cells have been used for devices which need high-capacity batteries. However, as small-sized devices, such as mobile phones or MP3 players, also have various functions and a high frequency of use, small-sized devices are requiring higher capacity batteries.

SUMMARY OF THE INVENTION

According to aspects of the present invention, a battery pack includes a battery assembly including a lithium-ion cell and a lithium-polymer cell connected in parallel to the lithium-ion cell.

According to aspects of the present invention, an electronic device includes a battery accommodating portion in which a battery pack is accommodated to receive or supply power, the battery pack having a battery assembly including a lithium-ion cell and a lithium-polymer cell electrically connected in parallel to the lithium-ion cell. According to aspects of the present invention, the lithium-ion cell may be formed in a prismatic shape. According to aspects of the present invention, the lithium-polymer cell may be formed in a pouch shape.

According to aspects of the present invention, a protective circuit board may have a primary protective circuit including a switching element positioned between the battery assembly and the external connection terminal unit, and a switching control unit to control the switching element.

According to aspects of the present invention, the switching element may have one current path with the external connection terminal unit, and have first and second paths respectively connected to the lithium-ion cell and lithium-polymer cell of the battery assembly.

According to aspects of the present invention, a charge/discharge operation may be performed in only one of the lithium-ion cell and lithium-polymer cell.

According to aspects of the present invention, a lithium-polymer cell having a thin thickness in a large cross-sectional area and a lithium-ion cell having a thick thickness in a small cross-sectional area are physically coupled and electrically connected in parallel, thus maximizing a battery mounting space and providing a high-capacity battery pack useful for a small-sized set.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings of which.

DETAILED DESCRIPTION OF THE EMBODIMENTS

Figure 1:
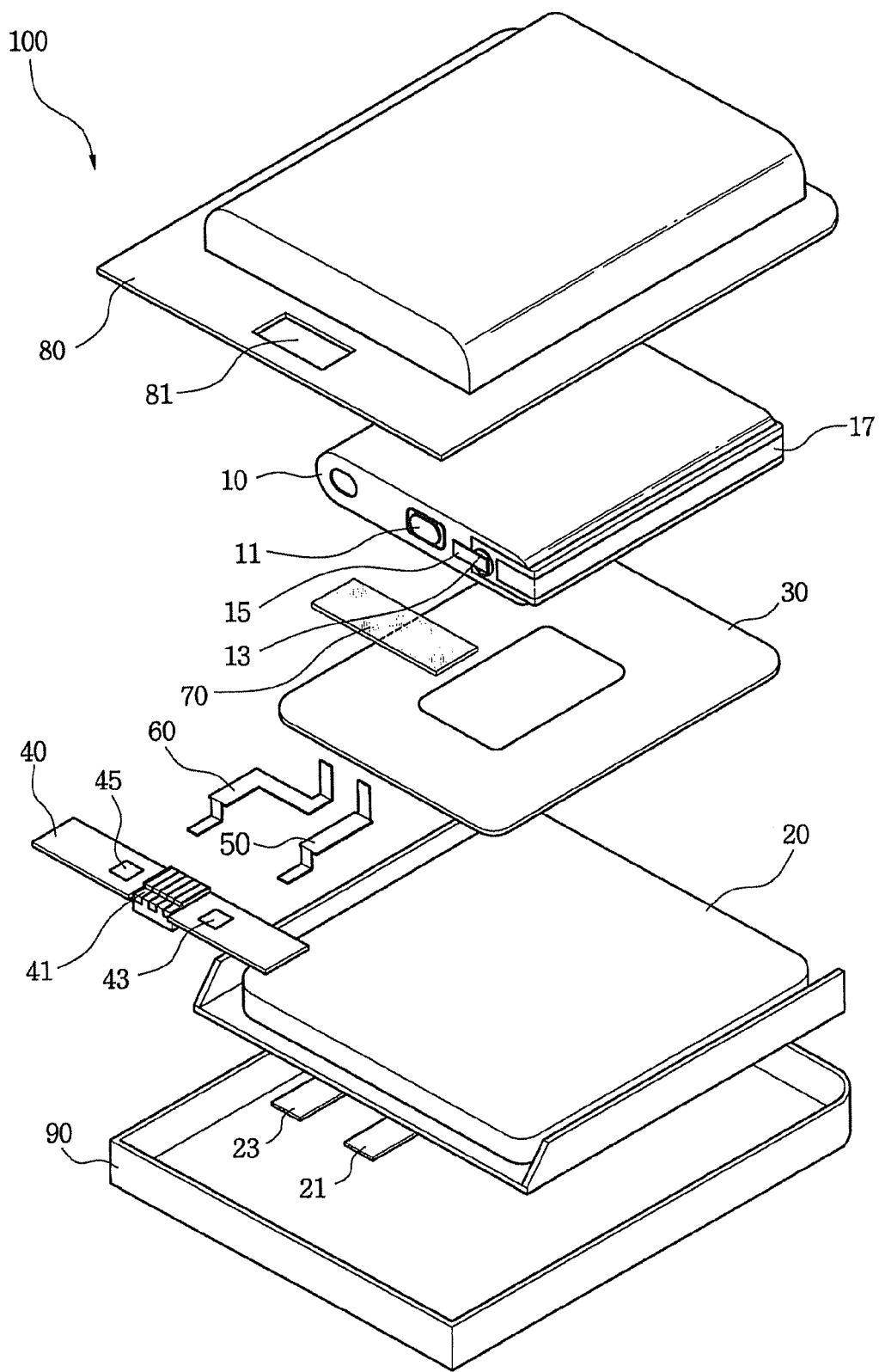
FIG. 1 is an exploded perspective view illustrating a constitution of a battery pack according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures. It will be understood that when an element is referred to as being electrically or physically "connected" or "coupled" to another element, it may be directly connected or coupled, electrically or physically, to the other element or intervening elements may be present. In contrast, when an element is referred to as being "directly connected" or "directly coupled" to another element, electrically or physically, there are no intervening elements present. Other words used to describe the relationship between elements should be interpreted in a like fashion (e.g., "between" versus "directly between", "adjacent" versus "directly adjacent", etc.).

Figure 2:
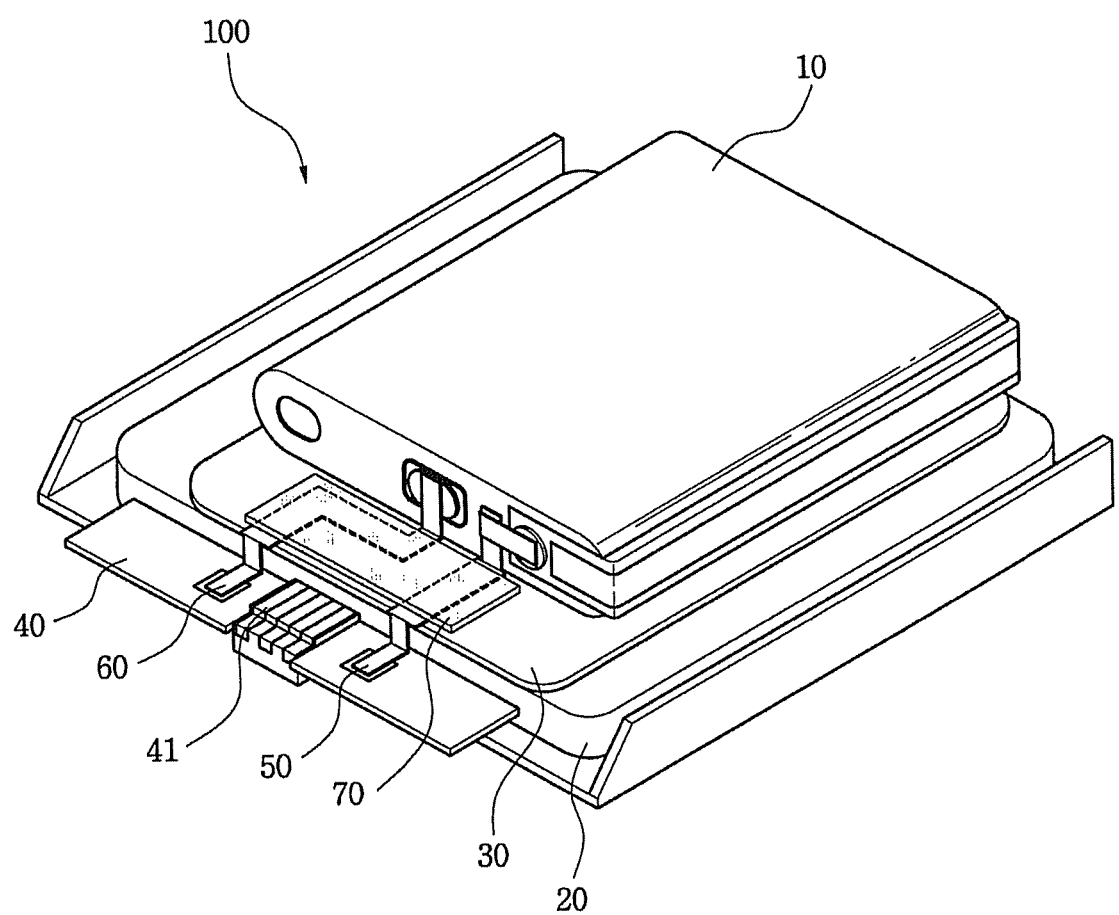
FIG. 2 is an assembled view of a lithium-ion cell and a lithium-polymer cell in FIG. 1.
Figure 3:
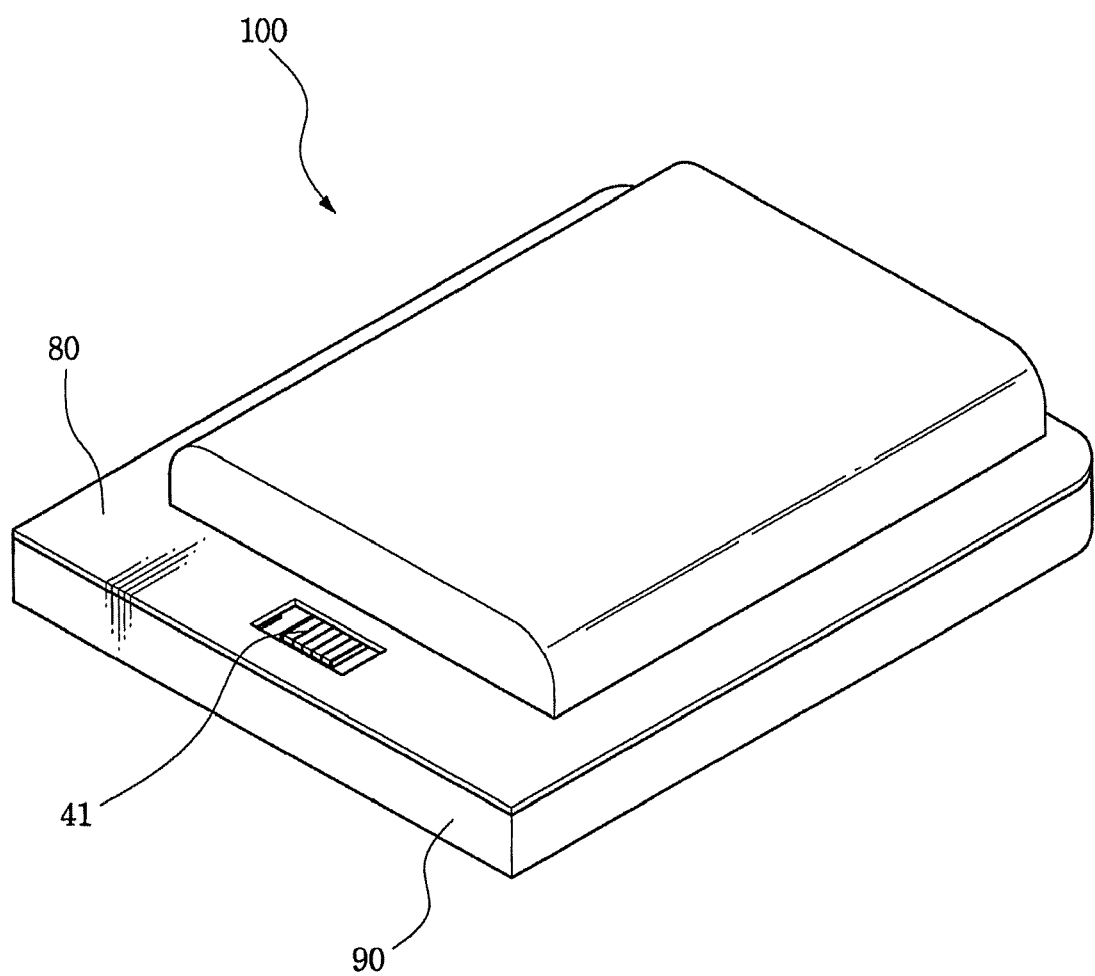
FIG. 3 is an assembled view of the battery pack in FIG. 1.

FIG. 1 is an exploded perspective view illustrating a battery pack according to an exemplary embodiment of the present invention, FIG. 2 is an assembled view of the lithium-ion cell and the lithium-polymer cell in FIG. 1, and FIG. 3 is an assembled view of the battery pack in FIG. 1. Referring to FIGS. 1 through 3, the battery pack 100 includes a lithium-ion cell 10, a lithium-polymer cell 20, a double adhesive tape 30 disposed between the lithium-ion cell 10 and lithium-polymer cell 20, a protective circuit board 40, and first and second leads 50 and 60 to electrically connect the lithium-ion and 10 cell and the protective circuit board 40.

The battery pack 100 further includes a coverlay 70 to insulate the first and second leads 50 and 60 from the exterior. The battery pack 100 also includes upper and lower cases 80 and 90.

When the lithium-ion cell 10 is formed in a prismatic shape, the lithium-ion cell 10 is formed by accommodating an electrode assembly in a can formed of a metallic material, such as aluminum formed by a deep drawing method; finishing the top end of the can with a cap assembly; and then injecting an electrolyte into the can.

In this case, a cap-up 11 is a negative terminal that protrudes from a top portion of the lithium-ion cell 10, and a positive terminal is disposed on a cap plate. A positive temperature coefficient (PTC) thermistor 13 can be formed at the positive terminal 15. The positive terminal 15 is formed of a material such as nickel on the cap plate by laser welding.

Alternatively, when it is difficult to connect the positive terminal 15 directly to the cap plate due to an insulating material formed on the cap plate, the positive terminal 15 may be disposed on the insulating material and electrically connected to the cap plate through a connection tab 17 connected to the can, which may be an electrode terminal.

When the lithium-polymer cell 20 is formed in a pouch shape, the lithium-polymer cell 20 is formed by accommodating the electrode assembly (not shown) on a lower surface of a pouch casing with a space for accommodating the electrode assembly, covering the lower surface with an upper surface of the pouch casing, and then sealing the pouch casing. In this case, positive and negative electrode tabs 21 and 23 electrically connected to the protective circuit board 40 protrude outside of the pouch casing.

The double adhesive tape 30 is disposed between the lithium-ion cell 10 and the lithium-polymer cell 20 to allow them to be physically adhered to each other. In this case, the double adhesive tape 30 may have a notch (not shown) formed by removing a central portion of the double adhesive tape 30. The notch can minimize a thickness increase when a central portion of the can is swelled in charge as well as accommodate the first and second leads 50 and 60.

The protective circuit board 40 is disposed at one side of the lithium-ion cell 10 and lithium-polymer cell 20 and the protective circuit board 40 couple the lithium-ion cell 10 and the lithium-polymer cell 20. The protective circuit board 40 includes protective elements, such as a protective circuit, a charge/discharge element unit, a PTC thermistor, a fuse, and the like, but is not limited thereto. The protective circuit board 40 may be formed on a printed circuit board (PCB) and have an interconnection pattern. The protective circuit board 40 further includes an external connection terminal unit 41 to connect the lithium-ion cell 10 and the lithium-polymer cell 20 to an external device.

The external connection terminal unit 41 may have one or a plurality of terminals, and may include a power terminal, a ground terminal, an input/out terminal, and a thermistor terminal but is not limited thereto.

The protective circuit board 40 further includes positive and negative terminals 43 and 45 to electrically connect the lithium-ion cell 10 and lithium-polymer cell 20. In this case, respective positive and negative terminals 43 and 45 are disposed on the protective circuit board 40 such that the positive terminal 15 of the lithium-ion cell 10 and the positive electrode tab 21 of the lithium-polymer cell 20 are electrically connected to the positive terminal 43, and the negative terminal 11 of the lithium-ion cell 10 and the negative electrode tab 23 of the lithium-polymer cell 20 are electrically connected to the one negative terminal 45. Specifically, the positive electrode terminal 15 of the lithium-ion cell 10 is electrically connected to the positive terminal 43 of the protective circuit board 40 via the first lead 50; and the negative electrode terminal 11 of the lithium-ion cell 10 is electrically connected to the negative terminal 45 of the protective circuit board 40. However, aspects of the present invention are not limited thereto.

Alternatively, a plurality of the positive terminals 43 and a plurality of the negative terminals 45 may be disposed on the protective circuit board 40 such that the positive terminal 15 of the lithium-ion cell 10 (via the first lead 50) and the positive electrode tab 21 of the lithium-polymer cell 20 are electrically connected to different positive terminals 43, respectively, and the negative terminal 11 of the lithium-ion cell 10 (via the second lead 60) and the negative electrode tab 23 of the lithium-polymer cell 20 are electrically connected to different negative terminals 45, respectively.

Alternatively, the positive terminal 15 of the lithium-ion cell 10 (via the first lead 50) and the positive electrode tab 21 of the lithium-polymer cell 20 may be electrically connected to one positive terminal 43 disposed on the protective circuit board 40, and the negative terminal 11 of the lithium-ion cell 10 (via the second lead 60) and the negative electrode tab 23 of the lithium-polymer cell 20 are electrically connected to different negative terminals 45, respectively.

On the other hand, the positive terminal 15 of the lithium-ion cell 10 (via the first lead 50) and the positive electrode tab 21 of the lithium-polymer cell 20 may be electrically connected to different positive terminals 43, respectively, and the negative terminal 11 of the lithium-ion cell 10 (via the second lead 60) and the negative electrode tab 23 of the lithium-polymer cell 20 are electrically connected to one negative terminal 45.

Thus, the lithium-ion cell 10 and lithium-polymer cell 20 connected to the protective circuit board 40 are electrically connected in parallel to each other, and constitute a core-pack-type secondary battery. When the lithium-ion cell 10 and lithium-polymer cell 20 connected in parallel and are connected to an external device, a charge or discharge operation is performed. That is, when the external device to which the lithium-ion cell 10 and the lithium-polymer cell 20 are connected via the protective circuit board 40 is a power source, such as a charger, the charge operation is performed and when the external device is a load, the discharge operation is performed. In such case, the charge and discharge operations are not performed simultaneously but performed sequentially by the protective circuit formed on the protective circuit board 40 in the lithium-ion cell 10 and lithium-polymer cell 20 connected in parallel. That is, when the charge or discharge operation is performed in any one of the lithium-ion cell 10 and lithium-polymer cell 20, the charge or discharge operation is not performed in the other cell. Further, the lithium-ion cell 10 and lithium-polymer cell 20 may be sequentially controlled by an electronic device employing the battery alone or in addition to the protective circuit formed on the protective circuit board 40.

Detailed description of the charge and discharge operations will be described later with reference to a circuit of a battery pack in FIG. 4 according to an exemplary embodiment of the present invention.

The protective circuit board 40 may be connected to any one of the lithium-ion cell 10 and lithium-polymer cell 20 before they are adhered to each other, and then connected to the other cell after they are coupled to each other. Alternatively, the protective circuit board 40 may be connected to the lithium-ion cell 10 and lithium-polymer cell 20 after they are adhered to each other.

The first and second leads 50 and 60 are provided for electrical connection between the protective circuit board 40 and one of the lithium-ion cell 10 and the lithium-polymer cell 20. In this exemplary embodiment, as illustrated in FIG. 2, the first lead 50 connects the positive electrode terminal 43 of the protective circuit board 40 to the positive electrode terminal 15 of the lithium-ion cell 10, and the second lead 60 connects the negative electrode terminal 45 of the protective circuit board 40 to the cap-up 11 that is a negative electrode terminal of the lithium-ion cell, so that the protective circuit board 40 and the lithium-ion cell 10 are electrically connected to each other. In this case, the first and second leads 50 and 60 are preferably adhered to a portion of the double adhesive tape 30. The coverlay 70 that is an insulating film for circuit protection is then attached on the first and second leads 50 and 60 to insulate them from the exterior and to enhance adhesion with the cell. However, aspects of the present invention are not limited thereto such that at least one of the lithium-ion cell 10 and the lithium-polymer cell 20 may include electrode tabs electrically connected to respective terminals of the protective circuit board 40, at least one of the lithium-ion cell 10 and the lithium-polymer cell 20 may include leads electrically connected to respective terminals of the protective circuit board 40, or the lithium-ion cell 10 may have electrode tabs electrically connected to respective terminals of the protective circuit board 40 while the lithium-polymer cell 20 has leads electrically connected to the respective terminals of the protective circuit board 40.

After the lithium-ion cell 10 and lithium-polymer cell 20 are physically joined and electrically connected to the protective circuit board 40, the lithium-ion cell 10, the lithium-polymer cell 20, and the protective circuit board 40 are accommodated in or housed in an external case including the upper and lower cases 80 and 90, thus completing a battery pack 100 as illustrated in FIG. 3. In this case, a hole 81 is formed on the upper case 80 such that the external connection terminal unit 41 formed on the protective circuit board 40 is connectable to an external device. Although the hole 81 is formed in the upper case 80, aspects of the present invention are not limited thereto such that the hole 81 may be formed in the upper or lower case 80 and 90 according to the location of the external connection terminal unit 41, which may further be located elsewhere according to a configuration of the external device to which the battery pack 100 is connectable.

Figure 4:
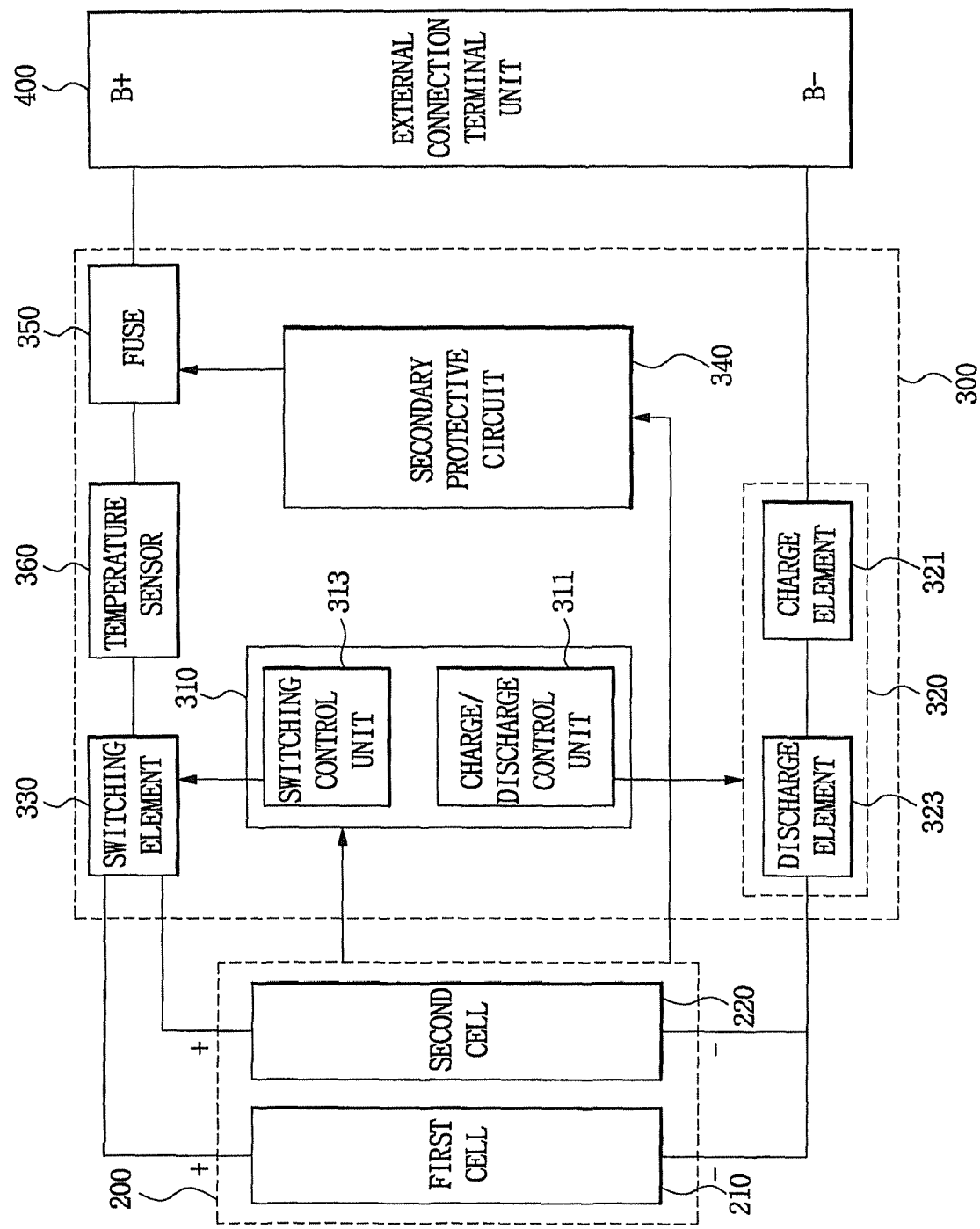
FIG. 4 is a circuit diagram illustrating a constitution of a battery pack according to an exemplary embodiment of the present invention.

FIG. 4 is a circuit diagram illustrating circuitry of a battery pack according to an exemplary embodiment of the present invention. The battery pack includes a battery assembly 200, a protective circuit board 300, and an external connection terminal unit 400.

The battery assembly 200 includes different types of first and second cells 210 and 220 connected in parallel, i.e., when the first cell 210 is a lithium-ion cell, the second cell 220 is a lithium-polymer cell; and when the first cell 210 is a lithium-polymer cell, the second cell 220 is a lithium-ion cell.

Positive electrodes of the first and second cells 210 and 220 are connected to a power terminal B+ of the external connection terminal unit 400 through a switching element 330, and negative electrodes of the first and second cells 210 and 220 are connected to a ground terminal B− of the external connection terminal unit 400 through a charge/discharge element unit 320.

The battery assembly 200 transmits various information about the battery assembly 200, i.e., a charge potential of the cell and an amount of current that flows through the cell, to a primary protective circuit 310. When a secondary protective circuit 340 is provided in the battery pack, the battery assembly 200 may also transmit such information to the secondary protective circuit 340.

The protective circuit board 300 is formed by disposing electric elements on a printed circuit board (PCB) by such methods as spot welding, soldering, or the like. The protective circuit board 300 may include a primary protective circuit 310, a charge/discharge element unit 320, and a switching element 330. The protective circuit board 300 may further include a secondary protective circuit 340, a fuse 350, and a temperature sensor 360.

The primary protective circuit 310 receives signals transmitted from the battery assembly 200 and controls charge and discharge operations according to the information received from the battery assembly 200.

The charge/discharge control unit 311 in the primary protective circuit 310 outputs charge/discharge control signals to control the charge/discharge element unit 320 to be turned off when over-charge, over-discharge, or over-current occurs or is about to occur so as to interrupt electrical flow such that a charge or discharge operation does not occur.

The switching control unit 313 in the primary protective circuit 310 outputs switching control signals to control the switching element 330 such that a charge or discharge operation is performed in any one of the first and second cells 210 and 220.

The charge/discharge element unit 320 may be disposed in a high current path between the battery assembly 200 and the power terminal B+ or between the battery assembly 200 and the ground terminal B−. The charge/discharge element unit 320 includes charge and discharge elements 321 and 323 operated by control signals of the charge/discharge control unit 311 in the primary protective circuit 310. That is, when the battery assembly 200 is connected to an external power supply through the external connection terminal unit 400 and the charge element 321 is turned on, the battery assembly 200 is charged. When the battery assembly 200 is connected to a load through the external connection terminal unit 400 and the discharge element 323 is turned on, the battery assembly 200 is discharged to supply power to the load.

When an abnormal operation such as over-charge, over-discharge, or over-current occurs or is about to occur, the charge/discharge element unit 320 is turned off by control signals from the charge/discharge control unit 311 so as to interrupt charge and discharge operations. Preferably, the charge and discharge elements 321 and 323 include metal oxide semiconductor field effect transistors (MOSFET), which have small power consumption and are easily implementable. The charge and discharge elements 321 and 323 may be NMOSFETs or PMOSFETs.

The switching element 330 is positioned on a high current path between the battery assembly 200 and the external connection terminal unit 400. However, aspects of the present invention are not limited thereto such that the switching element 330 may be positioned between the battery assembly 200 and the ground terminal B−. The switching element 330 is operated by control signals from the switching control unit 313. The switching element 330 has one current path with the external connection terminal unit 400, and has first and second paths respectively connected to the first and second cells 210 and 220 with the battery assembly 200. Thus, the switching element 330 is switched to select the first or second path depending on a control signal from the switching control unit 313, thereby electrically connecting only one of the first and second cells 210 and 220 to the external connection terminal unit 400. Accordingly, a charge or discharge operation is performed only in one of the first and second cells 210 and 220. Preferably, a field effect transistor (FET), which has easy switching and a small power consumption, is used as the switching element 330.

The secondary protective circuit 340 is operated in response to signals input from the battery assembly 200. When an abnormal operation such as over-current occurs, the secondary protective circuit 340 cuts the fuse 350 positioned on a high current path between the battery assembly 200 and the power terminal B+ or between the battery assembly 200 and the ground terminal B− so as to interrupt electrical flow and thus protect an accident such as firing or blasting.

The fuse 350 is positioned on a high current path between the battery assembly 200 and the external connection terminal unit 400. When an abnormal operation such as over-charge, over-discharge or over-current occurs or is about to occur, the fuse 350 is melted and/or cut by force, to open a circuit and thus interrupt electrical flow. However, aspects of the present invention are not limited thereto such that the fuse 350 may be positioned between the battery assembly 200 and the ground terminal B−. The fuse 350 is connected to the secondary protective circuit 340 to operate in accordance with control signals from the secondary protective circuit 340. The fuse 350 may be a self-control protector (SCP). When the temperature used in a process of manufacturing a typical battery pack is below 110° C. and the internal temperature of the battery pack is over 130° C., the fuse 350 may be heated or blasted due to a swelling phenomenon. For this reason, the fuse 350 is preferably melted and cut at a temperature of 110 to 130° C.

The temperature sensor 360 is an element in which resistance is changed according to a temperature. The temperature sensor 360 is positioned on a high current path between the battery assembly 200 and the external connection terminal unit 400. However, aspects of the present invention are not limited thereto such that the temperature sensor 360 may be positioned between the battery assembly 200 and the ground terminal B−. The temperature sensor 360 may be a positive temperature coefficient (PTC) thermistor. When temperature increases due to an abnormal operation, such as over-heat or over-current, resistance increases to reduce electrical flow, thus ensuring stability of the battery pack.

The external connection terminal unit 400 may include one or a plurality of terminals as described above. The external connection terminal unit 400 may include a power terminal B+, a ground terminal B−, an input/output terminal (not shown) and a thermistor terminal (not shown) but is not limited thereto. Although it has been described in FIG. 4 that the external connection terminal unit 400 is a separate component from the protective circuit board 300, the external connection terminal unit 400 may be provided at one side of the protective circuit board 300.

Figure 5:
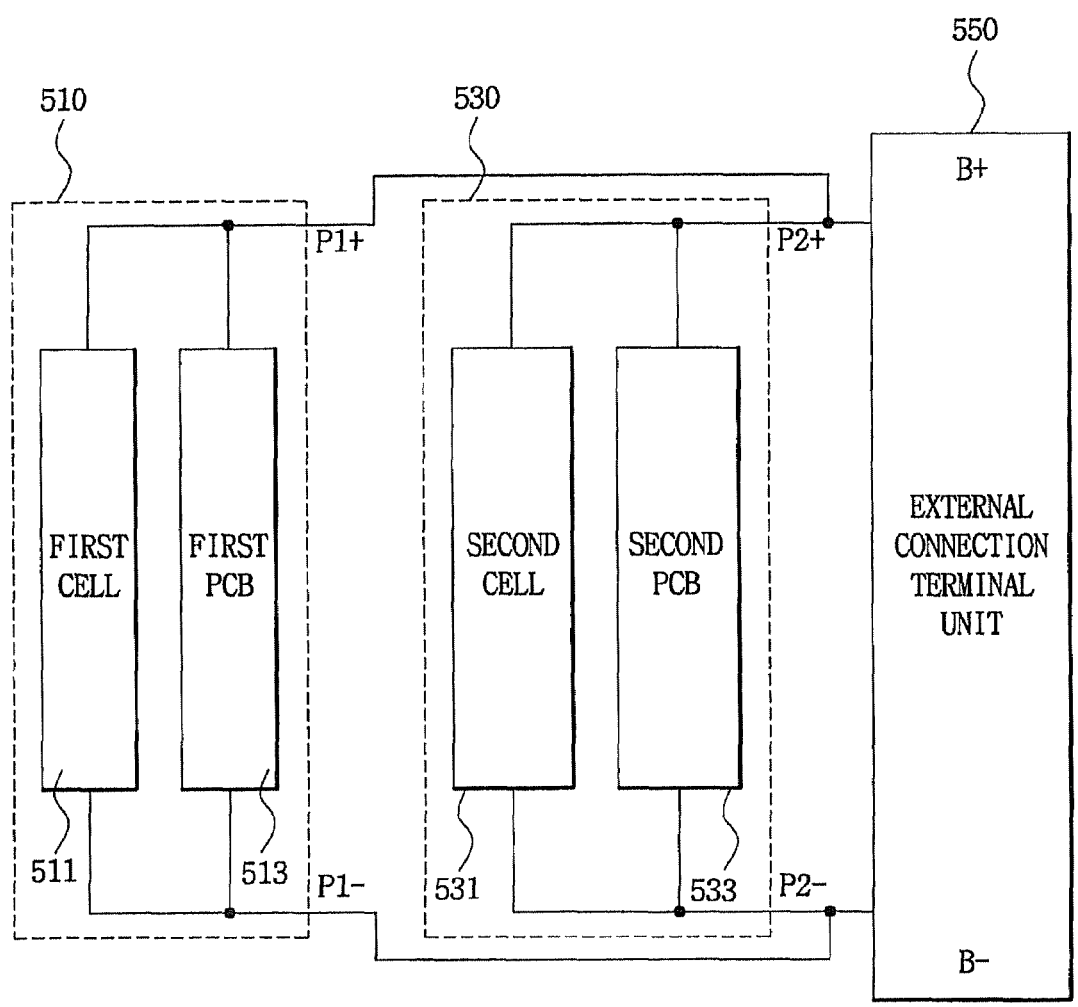
FIG. 5 is a circuit diagram illustrating a constitution of a battery pack according to another exemplary embodiment of the present invention.

FIG. 5 is a circuit diagram illustrating circuitry of a battery pack according to another exemplary embodiment of the present invention. The battery pack includes first and second core packs 510 and 530 connected in parallel and an external connection terminal unit 550.

The first core pack 510 includes a first cell 511 and a first protective circuit board 513. Since the first cell 511 and the first protective circuit board 513 are the same components as the first cell 210 and the protective circuit board 300 in FIG. 4, detailed descriptions thereof will be omitted.

The second core pack 530 includes a second cell 531 and a second protective circuit board 533. Since the second cell 531 and the second protective circuit board 533 are the same components as the second cell 220 and the protective circuit board 300 in FIG. 4, detailed descriptions thereof will be omitted.

In this case, the first and second core packs 510 and 530 are connected in parallel to each other, so that a positive electrode terminal P1+ of the first core pack 510 and a positive electrode terminal P2+ of the second core pack 530 are connected to a power terminal B+ of the external connection terminal unit 550, and a negative electrode terminal P1− of the first core pack 510 and a negative electrode terminal P2− of the second core pack 530 are connected to a ground terminal B− of the external connection terminal unit 550.

While two different cells are connected to one protective circuit board 300 in FIG. 4, two different cells are respectively connected to two different protective circuit boards 513 and 533 in FIG. 5, thus ensuring electrical stability.

Accordingly, when any one of the first and second protective circuit boards 513 and 533 is damaged, only the one cell connected to the damaged protective circuit board is not operable but the other cell may be operable, thus ensuring electrical stability as compared with a battery pack including one protective circuit board.

Figure 6:
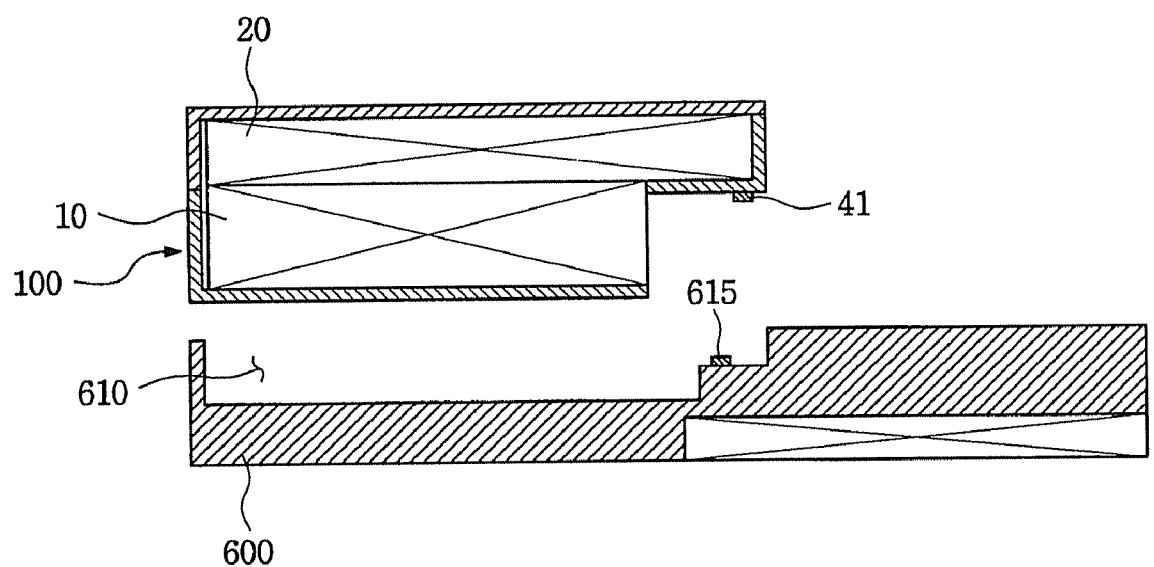
FIG. 6 is a cross-sectional view of an electronic device using a battery pack according to an embodiment of the present invention.

FIG. 6 is a cross-sectional view of an electronic device using a battery pack according to an exemplary embodiment of the present invention and illustrates the electronic device 600 and the battery pack 100 provided with the electronic device 600.

The electronic device 600 may be a load of a portable device that receives power supplied by the battery pack 100 or a charger that supplies power to the battery pack 100.

The electronic device 600 has a battery accommodating portion 610 for accommodating the battery pack 100, and an external terminal portion 615 connected to an external connection terminal portion 41 of the battery pack 100 is provided at one side of the battery accommodating portion 610.

When the battery pack 100 is accommodated in the battery accommodating portion 610 of the electronic device 600, a lithium-ion cell 10 having a thick thickness in a small cross-sectional area may first be inserted into the battery accommodating portion 610 rather than a lithium-polymer cell 20 having a thin thickness in a large cross-sectional area such that the lithium-ion cell 10 is positioned inside the battery accommodating portion 610. In this case, the external connection terminal portion 41 of the battery pack 100 is electrically connected to the external terminal portion 615 provided in the battery accommodating portion 610.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery pack, comprising:
a battery assembly, comprising:
a non-pouch shape cell; and
a pouch shape cell electrically connected in parallel to the non-pouch shape cell,
wherein a thickness of the pouch shape cell is less than a thickness of the non-pouch shape cell, and a cross-sectional area of the pouch shape cell is greater than a cross-sectional area of the non-pouch shape cell.

2. The battery pack of claim 1, wherein the non-pouch shape cell and pouch shape cell are adhered to each other by a double adhesive tape.

3. The battery pack of claim 1, wherein the non-pouch shape cell is formed in a prismatic shape.

4. The battery pack of claim 1, further comprises:
a protective circuit board disposed at one side of the battery assembly, the protective circuit board including an external connection terminal unit to electrically connect the battery pack to an external device;
first and second leads to electrically connect the battery assembly and the protective circuit board;
a coverlay disposed on the first and second leads; and
an external case to accommodate the battery assembly and the protective circuit board.

5. The battery pack of claim 4, wherein the one protective circuit board is electrically connected to the non-pouch shape cell and the pouch shape cell of the battery assembly.

6. The battery pack of claim 4, wherein the protective circuit board comprises:
a first protective circuit board disposed at one side of the battery assembly electrically connected to the non-pouch shape cell of the battery assembly; and
a second protective circuit board disposed at the one side of the battery assembly electrically connected to the pouch shape cell of the battery assembly.

7. The battery pack of claim 4, wherein the protective circuit board includes at least one positive terminal and at least one negative terminal to which the non-pouch shape cell and the pouch shape cell are each connected.

8. The battery pack of claim 7, wherein positive terminals of the non-pouch shape cell and the pouch shape cell are connected to the one positive terminal of the one protective circuit board, and negative terminals of the non-pouch shape cell and the pouch shape cell are connected to the one negative terminal of the protective circuit board.

9. The battery pack of claim 7, wherein the positive terminals of the non-pouch shape cell and the pouch shape cell are connected to different positive terminals of the protective circuit board, respectively, and the negative terminals of the non-pouch shape cell and the pouch shape cell are connected to different negative terminals of the protective circuit board, respectively.

10. The battery pack of claim 7, wherein the positive terminals of the non-pouch shape cell and the pouch shape cell are connected to the one positive terminal of the protective circuit board, and the negative terminals of the non-pouch shape cell and the pouch shape cell are connected to different negative terminals of the protective circuit board, respectively.

11. The battery pack of claim 7, wherein the positive terminals of the non-pouch shape cell and the pouch shape cell are connected to different positive terminals of the protective circuit board, respectively, and the negative terminals of the non-pouch shape cell and the pouch shape cell are connected to the one negative terminal of the protective circuit board.

12. The battery pack of claim 4, wherein the protective circuit board has a primary protective circuit comprising:
a switching element disposed between the battery assembly and the external connection terminal unit; and
a switching control unit to control the switching element.

13. The battery pack of claim 12, wherein the switching element has one current path with the external connection terminal unit, and has first and second paths respectively connected to the non-pouch shape cell and the pouch shape cell of the battery assembly.

14. The battery pack of claim 12, wherein a charge/discharge operation is performed in only one of the non-pouch shape cell and the pouch shape cell at a time.

15. An electronic device, comprising:
a battery accommodating portion in which a battery pack is accommodated to receive or supply power,
wherein the battery pack comprises:
a battery assembly comprising:
a non-pouch shape cell; and
a pouch shape cell electrically connected in parallel to the non-pouch shape cell,
wherein a thickness of the pouch shape cell is less than a thickness of the non-pouch shape cell, and a cross-sectional area of the pouch shape cell is greater than a cross-sectional area of the non-pouch shape cell.

16. The electronic device of claim 15, wherein the non-pouch shape cell is formed in a prismatic shape.

17. The electronic device of claim 15, wherein the non-pouch shape cell is positioned in the battery accommodating portion, and the pouch shape cell is positioned on the non-pouch shape cell.

18. The electronic device of claim 15, wherein the battery pack comprises:
a protective circuit board disposed at one side of the battery assembly, the protective circuit board including an external connection terminal unit to electrically connect the battery pack to the external device;
first and second leads to electrically connect the battery assembly and the protective circuit board;
a coverlay disposed on the first and second leads; and
an external case to accommodate the battery assembly and the protective circuit board.

19. The electronic device of claim 18, wherein the one protective circuit board is electrically connected to the non-pouch shape cell and the pouch shape cell of the battery assembly.

20. The electronic device of claim 18, wherein the protective circuit board comprises:
a first protective circuit board disposed at one side of the battery assembly electrically connected to the non-pouch shape cell of the battery assembly; and a second protective circuit board disposed at the one side of the battery assembly electrically connected to the pouch shape cell of the battery assembly.

21. The electronic device of claim 18, wherein the protective circuit board includes at least one positive terminal and at least one negative terminal to which the non-pouch shape cell and the pouch shape cell are each connected.

22. The electronic device of claim 18, wherein the protective circuit board has a primary protective circuit comprising:
   a switching element disposed between the battery assembly and the external connection terminal unit; and
   a switching control unit to control the switching element.

23. The electronic device of claim 22, wherein the switching element has one current path with the external connection terminal unit, and has first and second paths respectively connected to the non-pouch shape cell and the pouch shape cell of the battery assembly.

24. The electronic device of claim 22, wherein a charge/discharge operation is performed in only one of the non-pouch shape cell and the pouch shape cell at a time.

25. A battery pack, comprising:
   a battery assembly, comprising:
      a first cell having a first thickness and a first cross-sectional area, and
      a second cell electrically connected in parallel to the first cell and coupled to a portion of the first cell, the second cell having a second thickness and a second cross-sectional area; and
   at least one protection circuit board electrically connected to the battery assembly,
   wherein the first thickness is less than the second thickness, and the first cross-sectional area is greater than the second cross-sectional area.

26. The battery pack of claim 25, wherein the first cell is a pouch shape cell, and the second cell is a non-pouch shape cell.

27. The battery pack of claim 25, wherein the battery pack is connectable to an external device to charge/discharge the battery pack, the external device having an accommodating portion corresponding to a shape of the battery assembly.

28. The battery pack of claim 27, wherein:
   the battery assembly further comprises an external connection terminal portion; and
   the external device comprises an external terminal portion in the accommodating portion,
   wherein the external connection terminal portion and the external terminal portion are connectable to electrically connect the battery assembly to the external device.

* * * * *